US012545295B2

United States Patent
Uziel et al.

(10) Patent No.: US 12,545,295 B2
(45) Date of Patent: Feb. 10, 2026

(54) IMAGE-BASED GENERATION OF DESCRIPTIVE AND PERCEPTIVE MESSAGES OF AUTOMOTIVE SCENES

(71) Applicant: GM GLOBAL TECHNOLOGY OPERATIONS LLC, Detroit, MI (US)

(72) Inventors: Roy Uziel, Givatayim (IL); Oded Bialer, Petach Tikva (IL); Claudia Goldman-Shenhar, Mevasseret Zion (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 132 days.

(21) Appl. No.: 18/511,539

(22) Filed: Nov. 16, 2023

(65) Prior Publication Data

US 2025/0162613 A1    May 22, 2025

(51) Int. Cl.
*G06V 20/58*    (2022.01)
*B60W 30/095*    (2012.01)
*B60W 60/00*    (2020.01)

(52) U.S. Cl.
CPC .... *B60W 60/0015* (2020.02); *B60W 30/0956* (2013.01); *G06V 20/58* (2022.01);
(Continued)

(58) Field of Classification Search
CPC .......... B60W 60/0015; B60W 30/0956; G06V 20/58; G06V 20/56; G06T 2216/00
See application file for complete search history.

(56) References Cited

U.S. PATENT DOCUMENTS 7,629,899 B2 * 12/2009 Breed .................... G08G 1/165
340/995.13
8,762,302 B1 * 6/2014 Spivack ................ G06Q 50/01
706/12

(Continued)

FOREIGN PATENT DOCUMENTS

CN    105677769 A  *  6/2016  ............. G06F 16/00
CN    114118349 A  *  3/2022  ............. B60L 53/00
(Continued)

OTHER PUBLICATIONS

Translation of WO2023/073807A1 (Year: 2023).*
(Continued)

*Primary Examiner* — Fadey S. Jabr

(57) ABSTRACT

A system includes: a traffic object detection module detecting traffic objects in an environment; an attention map highlighting module generating an attention map, highlighting relevant ones of the traffic objects or regions in which the relevant ones of the traffic objects are located; an image encoder, based on the attention map, encoding an image of the environment and generating an image embedding vector; a PLM module iteratively selecting and appending text to create a text message including selecting the text based on a score, the text message being a specific description of what is perceived in the environment; a text encoder encoding a portion of the text message created thus far to generate a text embedding vector; and a module, based on the image and text embedding vectors, to score the portion to generate the score, where the PLM module is configured to update the portion based on the score.

18 Claims, 5 Drawing Sheets

(52) U.S. Cl.
CPC .............. *B60W 2420/403* (2013.01); *B60W 2554/4049* (2020.02)

(56) References Cited

U.S. PATENT DOCUMENTS

| | | | |
|---|---|---|---|
| 10,983,526 B2* | 4/2021 | Golestan Irani | G06F 16/29 |
| 11,148,672 B1* | 10/2021 | Yamada | B60W 50/0098 |
| 2016/0357187 A1* | 12/2016 | Ansari | G08G 1/165 |
| 2017/0151910 A1* | 6/2017 | Sato | G06F 3/14 |
| 2019/0221121 A1* | 7/2019 | Guo | H04W 4/46 |
| 2020/0089251 A1* | 3/2020 | Golestan Irani | G06F 3/167 |
| 2020/0184278 A1* | 6/2020 | Zadeh | G06N 3/044 |
| 2020/0293041 A1* | 9/2020 | Palanisamy | G06N 3/08 |
| 2020/0384981 A1* | 12/2020 | Tawari | G06V 20/58 |
| 2021/0279514 A1* | 9/2021 | Turcot | B60W 60/00 |
| 2021/0279952 A1* | 9/2021 | Chen | G06N 3/047 |
| 2021/0312232 A1* | 10/2021 | Tensmeyer | G06N 3/084 |
| 2024/0311617 A1* | 9/2024 | Di Palo | G06V 10/82 |
| 2024/0317275 A1* | 9/2024 | Sugimoto | G06V 20/588 |
| 2024/0386711 A1* | 11/2024 | Hosomi | G06V 10/82 |
| 2025/0108817 A1* | 4/2025 | Kendall | G06V 10/766 |
| 2025/0136134 A1* | 5/2025 | Shetty | G10L 15/22 |

FOREIGN PATENT DOCUMENTS

| | | | | |
|---|---|---|---|---|
| CN | 114637846 A | * | 6/2022 | |
| CN | 114973050 A | * | 8/2022 | G06K 9/00791 |
| CN | 115146621 A | * | 10/2022 | |
| CN | 115310551 A | * | 11/2022 | |
| CN | 116386627 A | * | 7/2023 | |
| CN | 116861886 A | * | 10/2023 | G06F 40/216 |
| DE | 102019005851 A1 | * | 5/2020 | G06N 3/04 |
| FR | 3152908 A1 | * | 3/2025 | |
| KR | 102043060 B1 | * | 11/2019 | E04F 15/20 |
| WO | WO-2016130719 A2 | * | 8/2016 | B60W 30/10 |
| WO | WO-2020182591 A1 | * | 9/2020 | B60W 60/00 |
| WO | WO-2023009557 A1 | * | 2/2023 | G06N 3/045 |
| WO | WO-2023009766 A1 | * | 2/2023 | G06F 18/2113 |
| WO | WO-2023073807 A1 | * | 5/2023 | G06F 16/55 |
| WO | WO-2024044258 A1 | * | 2/2024 | G06T 11/00 |
| WO | WO-2024261187 A1 | * | 12/2024 | |
| WO | WO-2025029248 A1 | * | 2/2025 | G06F 16/95 |

OTHER PUBLICATIONS

Translation of CN115146621A (Year: 2022).*

Radford, Alec [ et al.]: Learning transferable visual models from natural language supervision. Preprint. [v1] Fri, Feb. 26, 2021 19:04:58 UTC. Feb. 26, 2021. 48 S. https://arxiv.org/abs/2103.00020v1 [abgerufen am Oct. 15, 2025].

Madaan, Aman [ et al.]: Self-refine: iterative refinement with self-feedback. Preprint. [v2] Thu, May 25, 2023 19:13:47 UTC. May 25, 2023. 54 S. https://arxiv.org/abs/2303.17651v2 [abgerufen am Oct. 15, 2025].

German Office Action from counterpart DE1020241005211, dated Oct. 15, 2025.

* cited by examiner

IMAGE-BASED GENERATION OF DESCRIPTIVE AND PERCEPTIVE MESSAGES OF AUTOMOTIVE SCENES

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to object detection and collision warning systems, and more particularly, to perception systems for describing and responding to environmental situations.

A host vehicle can include object detection and collision warning systems for detecting impending objects and performing countermeasures and/or taking evasive action to prevent a collision. The vehicle can include various sensors for detecting objects, such as other vehicles, pedestrians, cyclists, etc. A controller determines locations of the objects relative to the host vehicle and trajectories of the objects and the host vehicle. If it is determined that the host vehicle is likely to collide with one of the objects, a warning signal may be generated and/or the controller may perform some other countermeasure (e.g., decelerate the vehicle, apply the brakes, change a steering angle of the vehicle, etc.) to prevent the collision.

SUMMARY

A system is disclosed and includes: a traffic object detection module configured to detect traffic objects in an environment of a vehicle; an attention map highlighting module configured to i) generate an attention map, ii) highlight in the attention map at least one of relevant ones of the traffic objects and regions in which the relevant ones of the traffic objects are located, and iii) not highlight in the attention map non-relevant ones of the traffic objects and other non-traffic objects; and an image encoder configured, based on the attention map, to encode an image of the environment received from an imaging device and generate an image embedding vector. The system further includes a pretrained language model (PLM) module configured to perform an iterative process including iteratively selecting and appending text to create a text message. The PLM module is configured, during each iteration of the iterative process, to select text based on at least one score, the text message being a specific description of what is perceived in the environment of the vehicle. The system further includes: a text encoder configured to encode a portion of the text message created thus far to generate a text embedding vector; one or more modules configured, based on the image embedding vector and the text embedding vector, to score the portion of the text message created thus far to generate the at least one score, where the PLM module is configured to update the portion of the text message created thus far based on the at least one score; and at least one output device configured to output the text message when complete for an occupant of the vehicle.

In other features, the system further includes a perception and decision-making module configured to, based on at least information in the text message describing the environment of the vehicle, perform at least one of an autonomous driving operation and a countermeasure to avoid a collision.

In other features, for each iteration of the iterative process, the one or more modules comprise a vector comparing module configured to compare the text embedding vector to the image embedding vector and generate a first score. The PLM module is configured, for each iteration, to update the portion of the text message created thus far based on the first score.

In other features, for each iteration of the iterative process, the one or more modules include a language scoring module configured to analyze the text embedding vector to determine if the portion of the text message created thus far is grammatically correct and generate a second score based on this determination. The PLM module is configured, for each iteration, to update the portion of the text message created thus far based on the second score.

In other features, for each iteration of the iterative process, the one or more modules include an automotive vocabulary scoring module configured to analyze the text embedding vector to determine how many words of the portion of the text message created thus far are not automotive words and generate a third score based on this determination. The PLM module is configured, for each iteration, to update the portion of the text message created thus far based on the third score.

In other features, the one or more modules include multiple scoring modules and an overall scoring module. The multiple scoring modules are configured, for each iteration of the iterative process, to generate scores based on the portion of the text message created thus far. The overall scoring module is configured to generate an overall score based on the scores. The PLM module is configured to update the portion of the text message created thus far based on the overall score.

In other features, the scores include i) a first score indicative of how closely the text embedding vector matches the image embedding vector, ii) a second score indicative of how grammatically correct is the portion of the text message created thus far, and iii) a third score indicative of how many non-automotive words are included in the portion of the text message created thus far.

In other features, the system further includes an automotive scene caption module configured to receive the image embedding vector and automotive vocabulary, and, based on the image embedding vector and the automotive vocabulary, generate the text message such that the text message is automotive specific.

In other features, the PLM module is configured to replace one or more words of the portion of the text message created thus far based on the at least one score.

In other features, the PLM module is configured to begin with a sentence prefix and iteratively append automotive words to the sentence prefix to generate the text message.

In other features, the at least one output device includes a display, a speaker, and a haptic device.

In other features, a method of providing an image caption for an image of an environment of a vehicle is disclosed. The method includes: detecting traffic objects in the environment of the vehicle; generating an attention map; highlighting in the attention map at least one of relevant ones of the traffic objects and regions in which the relevant ones of the traffic objects are located; not highlighting in the attention map non-relevant ones of the traffic objects and other non-traffic objects; based on the attention map, encoding the image and generating an image embedding vector; performing an iterative process including iteratively selecting and appending text to create a text message; during each iteration of the iterative process, selecting text based on at least one score, the text message being a specific description of what is perceived in the environment of the vehicle; encoding a portion of the text message created thus far to generate a text embedding vector; based on the image embedding vector and the text embedding vector, scoring the portion of the text message created thus far to generate the at least one score; updating the portion of the text message created thus far based on the at least one score; and outputting the text message when complete for an occupant of the vehicle.

In other features, the method further includes, based on at least information in the text message describing the environment of the vehicle, performing at least one of an autonomous driving operation and a countermeasure to avoid a collision.

In other features, the method further includes for each iteration of the iterative process: comparing the text embedding vector to the image embedding vector and generate a first score; and updating the portion of the text message created thus far based on the first score.

In other features, the method further includes for each iteration of the iterative process: analyzing the text embedding vector to determine if the portion of the text message created thus far is grammatically correct and generate a second score based on this determination; and updating the portion of the text message created thus far based on the second score.

In other features, the method further includes for each iteration of the iterative process: analyzing the text embedding vector to determine how many words of the portion of the text message created thus far are not automotive words and generate a third score based on this determination; and updating the portion of the text message created thus far based on the third score.

In other features, the method further includes: for each iteration of the iterative process, generating scores based on the portion of the text message created thus far; generating an overall score based on the scores; and updating the portion of the text message created thus far based on the overall score.

In other features, the scores include i) a first score indicative of how closely the text embedding vector matches the image embedding vector, ii) a second score indicative of how grammatically correct is the portion of the text message created thus far, and iii) a third score indicative of how many non-automotive words are included in the portion of the text message created thus far.

In other features, the method further includes: receiving the image embedding vector and automotive vocabulary; and based on the image encoding vector and the automotive vocabulary, generating the text message such that the text message is automotive specific.

In other features, the method further includes replacing one or more words of the portion of the text message created thus far based on the at least one score.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

Figure 1:
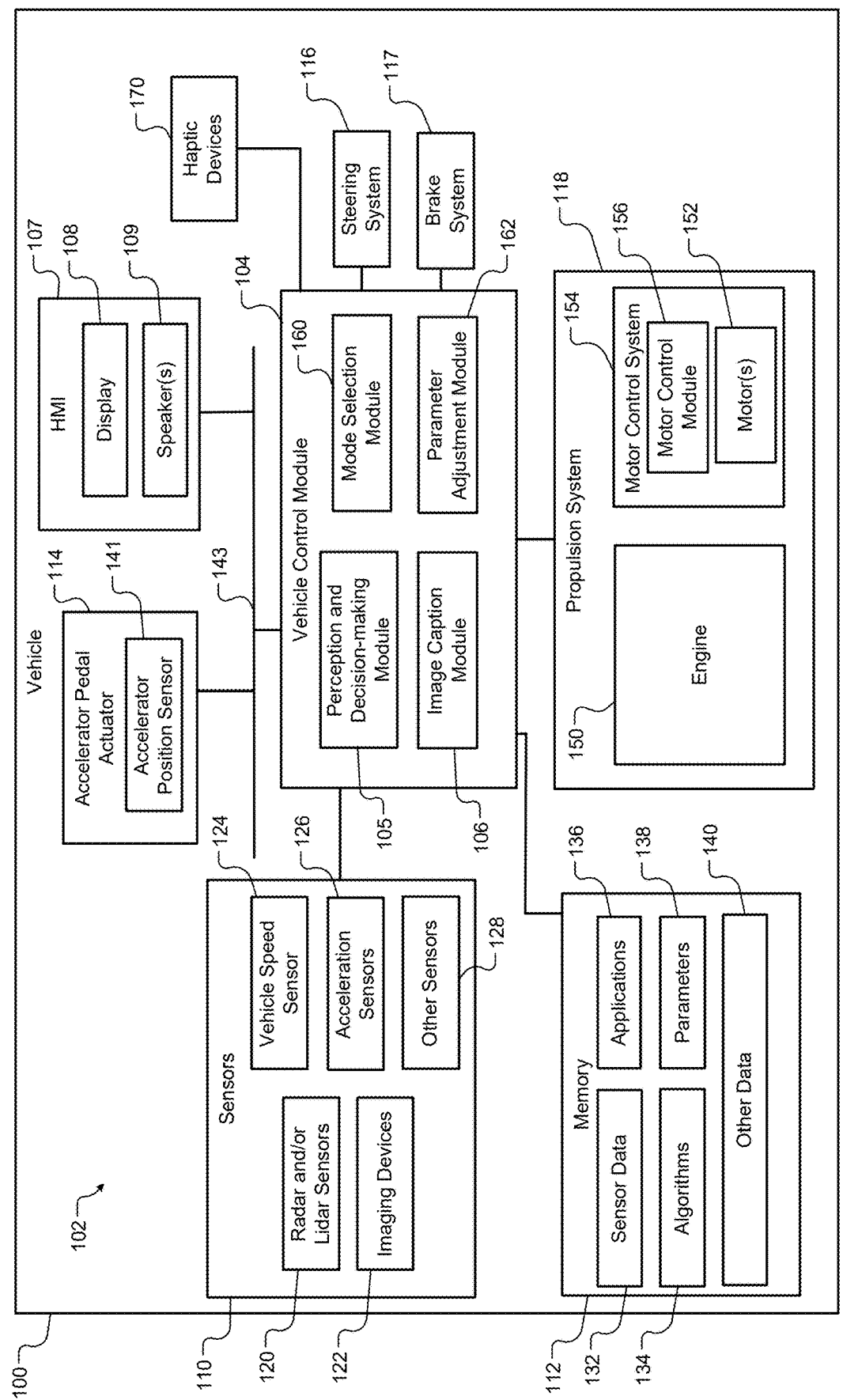
FIG. 1 is a functional block diagram of a vehicle including an image caption module in accordance with the present disclosure.

Generating textual descriptions from automotive images aids in conveying autonomous vehicle camera-based observations to occupants (e.g., driver and passengers) of a vehicle. The textual descriptions (or messages) may be displayed on a human machine interface (e.g., a center counsel display) of the vehicle. The observations enhance perception and decision-making abilities of the vehicle. Traditional image capturing techniques are limited and are typically inaccurate and/or incorrect in describing automotive scenarios (also referred to as environmental situations).

The examples set forth herein include a perception and decision-making system and an image capture module configured to generate descriptive and perceptive messages (referred to herein as "messages"). The message may include text messages and/or audio messages indicative of environmental situations. The image capture module may be implemented as part of the perception and decision-making system or separate from and communicate with the perception and decision-making system. The messages are tailored and specific to each environmental situation. As an example, a message may include a text message accurately describing the situation, such as a message indicating "A pedestrian intends to cross the road currently traveled by the host vehicle" or "The road (or lane) of the host vehicle is merging into highway with traffic." The text messages may be displayed along with the corresponding image of the environment and/or area referred to by the text message.

The examples further include a vision-language model that has been pre-trained and directs attention to traffic objects present in the scene of an image. As used herein a "traffic object" refers to a vehicle, a pedestrian, a cyclist, or other object that is in a path or approaching a path of a host vehicle and is relevant in making autonomous vehicle operational decisions. A traffic object typically does not refer to, for example, a tree, a building, a bird, etc. unless in a path of the host vehicle. The image is encoded using a vision language model to generate an image embedded vector. A text description is generated using the image embedding vector with a specific emphasis on automotive vocabulary. Automotive vocabulary refers to vocabulary that may be used to describe an environment of a vehicle.

The examples further include generating text explanations of automotive environments of a host vehicle based on images taken by the host vehicle. The host vehicle may be a fully autonomous, partially autonomous, or non-autonomous vehicle. The text descriptions i) convey perception of an environment of the host vehicle, as determined by the host vehicle, to a driver or passenger, ii) enhance a vision-language model for automotive perception tasks, iii) provides input to a controller (or planner) of the host vehicle to aid in decision-making, and iv) capture crucial situations (e.g., situations with high probabilities of a collision if evasive action is not taken) during a vehicle real-time operation to continuously improve autonomous vehicle operations. Textual descriptions of automotive scenes hold significant value for relaying information to vehicle occupants via a vehicle human-machine interface and for performing perception and decision-making operations. The textural descriptions are aligned with knowledge of a decision-making system and corresponding decision-making operations.

FIG. 1 shows a vehicle 100 including a perception and decision-making system 102 having a vehicle control module 104, which as shown includes a perception and decision-making module 105 and an image caption module 106. The perception and decision-making module 105 performs perception determining operations, planning operations, and decision-making operations. The image caption module 106 generates descriptive and perceptive messages describing what the perception and decision-making system 102 perceives as an environment (or scene) of the vehicle 100. Each of the messages not only describes a captured image but also what perception and decision-making system 102 sees and predicts (i.e., perceives) from the captured image. The image caption module 106 is trained for automotive scenarios. The messages may be displayed, audibly played out, and/or indicated via a display 108 and/or one or more speakers 109 of a human machine interface (HMI) 107 and/or via one or more other output devices. The image caption module 106 is further described below with respect to FIGS. 2-4. The vehicle control module 104 may perform various operations based on the messages, as further described below. The perception and decision-making module 105 may perform autonomous operations based on the messages.

The vehicle 100 further includes sensors 110, memory 112, an accelerator pedal actuator 114, a steering system 116, a brake system 117, and a propulsion system 118. The sensors 110 may include radar and/or lidar sensors 120, image devices (e.g., cameras) 122, a vehicle speed sensor 124, acceleration sensors (e.g., longitudinal and lateral acceleration sensors) 126, and other sensors 128. The memory 112 may store sensor data 132, algorithms 134, applications 136, parameters 138, and other data 140 (e.g., automotive data sets). The sensor data 132 may include data collected from the sensors 110 and/or other sensors, such as an accelerator position sensor 141 of the accelerator pedal actuator 114. The accelerator pedal actuator 114 and accelerator position sensor 141 and/or other devices referred to herein may be connected to the vehicle control module 104 via a controller area network (CAN) or other network bus 143. The algorithms 134 include the algorithms referred to herein that are implemented by the image caption module 106. The applications 136 may include the image caption module 106 and/or other applications.

The propulsion system 118 may include one or more torque sources, such as one or more motors and/or one or more engines (e.g., internal combustion engines). In the example shown in FIG. 1, the vehicle 100 includes an engine 150 and one or more motors 152. The torque sources are independently controlled. The propulsion system 118 includes a motor control system 154 that includes the one or more motors 152 and a motor control module 156 that may control operation of the one or more motors 152 based on signals from the vehicle control module 104.

The vehicle control module 104 may further include a mode selection module 160 and/or a parameter adjustment module 162. The module 160 may select different operating modes. As an example, the vehicle control module 104 may operate in a fully or partially autonomous mode and may control the steering system 116, brake system 117, and propulsion system 118. In an embodiment, the vehicle control module 104 controls operation of the systems 116-118 based on the messages and/or corresponding information in the messages generated by the image caption module 106.

In an embodiment, the perception and decision-making module 105 generates text describing the environment, which may be combined and/or compared to text provided by the image caption module 106. If the text generated by the modules 105, 106 does not match or correspond such that the texts describe the same environment, the perception and decision-making module 105 may take action. For example, the perception and decision-making module 105 may perform operations based on the text generated by the image caption module 106. The caption (or generated text) may add information that the perception and decision-making module 105 can integrate as part of its inputs and then based thereon determine what operations to perform. Based on the text from the image caption module 106 and text generated by the perception and decision-making module 105 and/or other inputs, the perception and decision-making module 105 may i) perform autonomous operations such as steering, braking, accelerating, etc., and/or ii) display and/or audibly playout descriptive and perceptive messages, perform haptic operations via haptic devices 170 (e.g., a seat vibration device), and/or output the messages and/or corresponding signals via other output devices.

As an example, the perception and decision-making module 105 may generate boundary boxes where pedestrians are located and determine road borders, and based on this information may incorrectly determine that a pedestrian does not intend to cross a road. The perception and decision-making module 105 may determine that the pedestrian is just standing still and does not plan to cross the road. The perception and decision-making module 105 may then receive the text message from the image caption module 106. The text message from the image caption module 106 provides an understanding of a scene indicating that the pedestrian does intend to cross the road. If the perception and decision-making module 105 initially determines that the pedestrian is not about to cross the street and the image caption module 106 determines that the pedestrian is about to cross the street, then the perception and decision-making module 105 determines that there is a mismatch in determinations and the intent of the pedestrian cannot be accurately perceived. In an embodiment, the perception and decision-making module 105 and the image caption module 106 recheck the state determinations. In another embodiment, the perception and decision-making module 105, out of an abundance of caution, operates as if the pedestrian is to cross the street by for example reducing speed of the vehicle to avoid a collision.

Figure 2:
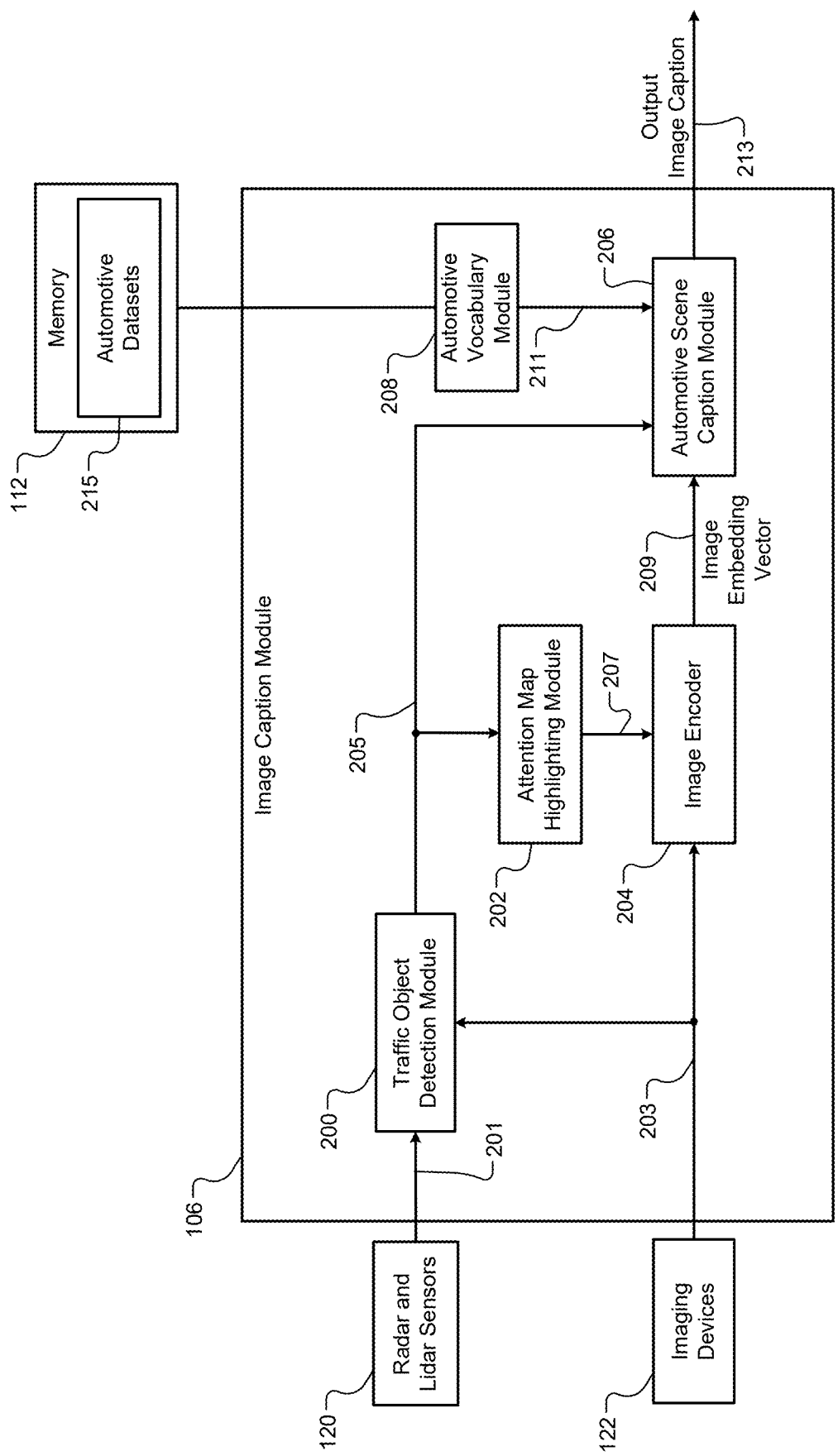
FIG. 2 is a functional block diagram of the image caption module including an automotive scene caption module in accordance with the present disclosure.

FIG. 2 shows the image caption module 106 that may receive outputs from the radar and lidar sensors 120 and the imaging devices 122, receive automotive vocabulary from the memory 112, and generate an output image caption (or descriptive message) of an environment visible in one or more images captured by the imaging devices 122. The image caption module 106 includes a traffic object detection module 200, an attention map highlighting module 202, an image encoder 204, an automotive scene caption module 206 and an automotive vocabulary module 208.

The traffic object detection module 200 may receive the outputs of the radar and/or lidar sensors 120 and the imaging devices 122 and detect traffic objects, such as vehicles, pedestrians, cyclists, cross walks, traffic lights, traffic signs, and road features (e.g., lane boundaries, types of lanes including oncoming traffic lanes and incoming traffic lanes). The traffic object detection module 200 may implement a neural network or and/or convolutional network to detect the traffic objects. The output from the radar and lidar sensors 120 is represented as signal 201. The output from the imaging devices 122 is represented as signal 203. The output of the traffic object detection module 200 is represented as signal 205.

The attention map highlighting module 202 creates an image similar to an image captured by the imaging devices 122, except the created image is in the form of an attention map that highlights traffic objects. The created image is represented as signal 207. In an embodiment, the created image highlights traffic objects of interest. The created images includes pixels of traffic objects having higher intensities than pixels of other objects (non-traffic objects). The intensities of the pixels of the traffic objects are increased whereas the intensities of the pixels of the non-traffic objects are decreased.

The image encoder 204 encodes images received from the imaging devices 122. Each encoded image provides an image embedding vector, represented as signal 209, that includes values indicative of the environment of the vehicle. The image encoder 204 may include a neural network and implement a vision language model such as a contrastive language image pretraining (CLIP) model. The CLIP model learns overtime. The CLIP model receives an image and encodes the image to generate an image embedding vector. The neural network is trained to encode images into a feature space to get respective image embedding vectors, which each include features of that image.

The vision language model may include multiple layers. Data is passed through each layer and is further processed by each of the layers such that the data becomes more and more descriptive of the image. Each layer includes patches respectively for the highlighted traffic objects. In an embodiment, the attention map highlighting module 202 increases the attention weights of patches or feature vectors in a last attention layer of the vision language model of the image encoder 204 via the signal 207. In another embodiment, the attention map highlighting module 202 increases the attention weights of the patches or feature vectors of two or more layers of the image encoder 204 associated with the traffic objects and reduces weights of feature vectors associated with patches that are not related to traffic objects. Thus, emphasis on traffic objects may occur at the last layer and optionally at one or more layers prior to the last layer of the vision language model.

Each patch has an associated feature vector. Each feature vector changes from layer to layer such that the feature vector becomes more descriptive of the feature (or traffic object). Feature vectors associated with non-traffic objects contribute less at each subsequent layer. Each layer has a same number of feature vectors and same sized feature vectors, but each subsequent layer has feature vectors that are more processed than feature vectors of a previous layer and are more accurately descriptive of an image. More and more information is combined by each layer and more complex functions are learned. The feature vectors of the last attention layer are combined to provide the image embedding vector for that image.

Figure 3:
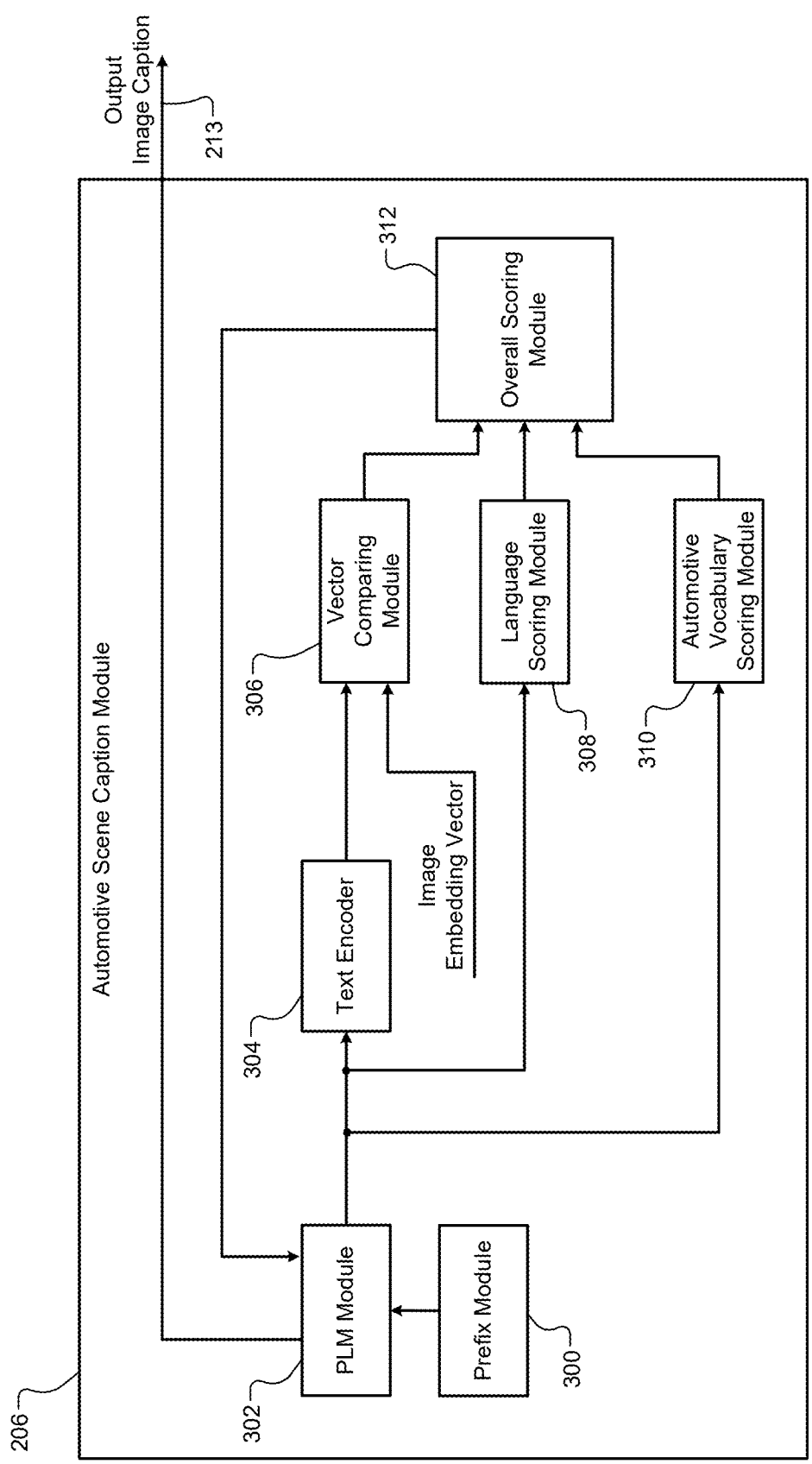
FIG. 3 is a functional block diagram of the automotive scene caption module in accordance with the present disclosure.

When there is text that describes an image, the text may be encoded by a text encoder to provide a text embedding vector. An example text encoder is shown in FIG. 3. The text embedding vector is similar to the image embedding vector for the same image. The text embedding vector of the text that describes the image resembles the image embedding vector of the image. This is true when the text describes the image. This is not true when the text does not describe the image. When the text does not describe the image, then the image embedding vector is different than the text embedding vector.

The image encoder 204 is pretrained for traffic objects and generates image embedding vectors associated with the traffic objects. The image embedding vectors describe traffic objects highlighted by the attention map highlighting module 202. An image embedding vector includes substantially less values than the number of pixels of the corresponding image. For example, an image may include 1 million pixels, whereas the image embedding vector may include 500 values. The 500 values represent relevant information that describes the image. As a result, the modules 202, 204 and 206 highlight information of interest in an image and provide a description that is focused on traffic objects of interest.

In an embodiment, the image encoder 204 is trained before used. This may include feeding text messages to a text encoder (e.g., the text encoder of FIG. 3) and feeding corresponding images to the image encoder 204 and comparing the vectors generated by the encoders. The text messages describe the images. The image encoder 204 is trained until the vectors match and/or are similar.

The automotive scene caption module 206 receives signals 205, 209 and automotive vocabulary 211 from the automotive vocabulary module 208 and generates and output image caption (or text message) 213. The automotive vocabulary module 208 obtains automotive terms from automotive datasets 215 stored in the memory 112. The automotive datasets 215 have text descriptions of different scenarios. The automotive vocabulary module 208 aids in automotive scene capturing by limiting vocabulary to automotive vocabulary. The automotive vocabulary module 208 takes words, phrases, and/or captions from previous automotive scenarios obtained while performing learning operations. The words in stored messages for numerous automotive scenarios are used as vocabulary datasets for describing encountered scenarios (or encountered automotive situations).

In an embodiment, the automotive scene caption module 206 generates the text message 213 such that: i) the text embedding vector of the text message 213 has a small cosine distance to the image embedding vector of the corresponding image; ii) the words in the text message (or sentence) are restricted to the vocabulary obtained from descriptions of automotive scenarios and thus limited to automotive vocabulary; and iii) the language used in the sentence is grammatically correct. This is a language model restriction. The automotive scene caption module 206 generates a sentence that when encoded by the text encoder of FIG. 3, which implements a vision language model, provides a text embedding vector that is similar to the image embedding vector generated by the image encoder 204. The sentence describes the image when the text embedding vector is similar to the image embedding vector. The automotive scene caption module 206 may determine the cosine distance between the vectors to determine if the text embedding vector is similar to the image embedding vector. The smaller the distance, the more the text embedding vector matches the image embedding vector. Other methods may be used to determine a difference between the vectors, such as the Manhattan distance (or L1 norm) or the Euclidean distance (or L2 norm) methods.

FIG. 3 shows the automotive scene caption module 206, which includes a prefix module 300, a pretrained language model (PLM) module 302, a text encoder 304, a vector comparing module 306, a language scoring module 308, an automotive vocabulary scoring module 310, and an overall scoring module 312. The prefix module 300 generates a sentence prefix (referred to herein as "the prefix") based on which a text message is generated. Words are iteratively added to the prefix to ultimately generate the text message, which is to be conveyed to a vehicle occupant. As an example, a prefix may be "An image of a." In an embodiment, the prefix does not describe the current automotive situation of the host vehicle. The prefix may be selected from stored predefined prefixes. In an embodiment, the prefix with the highest probability of being appropriate for the current automotive situation is selected. In an embodiment, the prefix is selected based on the image. In another embodiment, the prefix is not selected based on the image.

The PLM module 302 receives the prefix or current message and extends the prefix or current message by one or more words. In an embodiment, the PLM module 302 extends the current message word-by-word based on overall scores generated by the overall scoring module 312. The PLM module 302 selects words that satisfy the functions (or limitations) associated with modules 306, 308, 310 to build the output image caption 213.

The text encoder 304 receives the prefix or current message (i.e., portion of entire message created thus far) and encodes the message to generate a text embedding vector. The text encoder 304 is a vision language text encoder such as a CLIP text encoder. The text encoder 304 is trained with a vision language model. When the message is complete, the text encoder 304 encodes the complete message and provides a text embedding vector that matches an output of the image encoder 204 for a corresponding image that has been encoded.

The vector comparing module 306 compares the output of the text encoder 304 with the output of the image encoder 204 for each portion of the message thus far generated. In an embodiment, this includes determining a cosine distance between the text and image embedding vectors and generating a first score based on the cosine distance. The smaller the cosine distance the better (or higher) the first score.

The language scoring module 308 evaluates the message thus far generated and generates a second score. The language scoring module 308 checks if the message thus far generated is grammatically correct. The vision language model of the PLM module 302, when selecting words, selects one or more words with a high probability of being grammatically correct. In an embodiment, the PLM module 302 selects words based on historical texts, not based on the corresponding image. The PLM module 302 has numerous options to choose from when selecting words and selects the words with the highest probabilities of being grammatically correct. The selection may be based on words that have been preselected according to a hypothesis. The higher the probability that the message thus far is grammatically correct, the higher the second score.

The automotive vocabulary scoring module 310 generates a third score based on whether the words of the message thus far are automotive vocabulary words. The more words that are not automotive vocabulary words, the lower the score. Words of an automotive vocabulary includes words that can be used to describe an environment of a vehicle including words to describe states of roads, traffic objects, pedestrians, cyclists, etc. The automotive vocabulary can include terms to describe actions being performed or predicted to be performed by nearby traffic objects such as vehicles, pedestrians and/or cyclists.

The overall scoring module 312 determines an overall score based on the first, second and third scores. In an embodiment, this includes summing the first, second and third scores to provide the overall scores. In another embodiment, this includes weighing and summing the scores to provide the overall score. In an embodiment, the PLM module 302 selects words to maximize the overall score. In another embodiment, the PLM module 302 selects words that maximize the first, second and third scores and as a result the overall score. The first, second and third scores may be provided to the PLM module 302. The PLM module 302 may replace one or more words based on the first, second, third and/or overall scores. In an embodiment, the PLM module 302 iteratively replaces words to improve one or more of the first, second, third and overall scores. This iterative process may occur for each word and/or set of words selected in combination with the previously selected words for the current message being generated. The PLM module 302 may implement a neural network that has components including keys and probability values. Keys and probability values of each of the PLM attention layers may be adjusted to maximize the overall score and/or maximize the first, second and third scores.

As an example, the PLM module 302 may initially select from 50,000 words or sets of words during the process associated with FIG. 3 and choose a subset (e.g., 1000) of the words or sets of words with the highest scores when encoded and scored as described above. Words or sets of words in the subset that are not automotive words are removed from the subset. The PLM module 302 may then select from the remaining words or sets of words that best matches the output of the image encoder. In an embodiment, the message being generated is extended during iterations of the process of FIG. 3 in an autoregressive manner (word by word) as described.

Figure 4A:
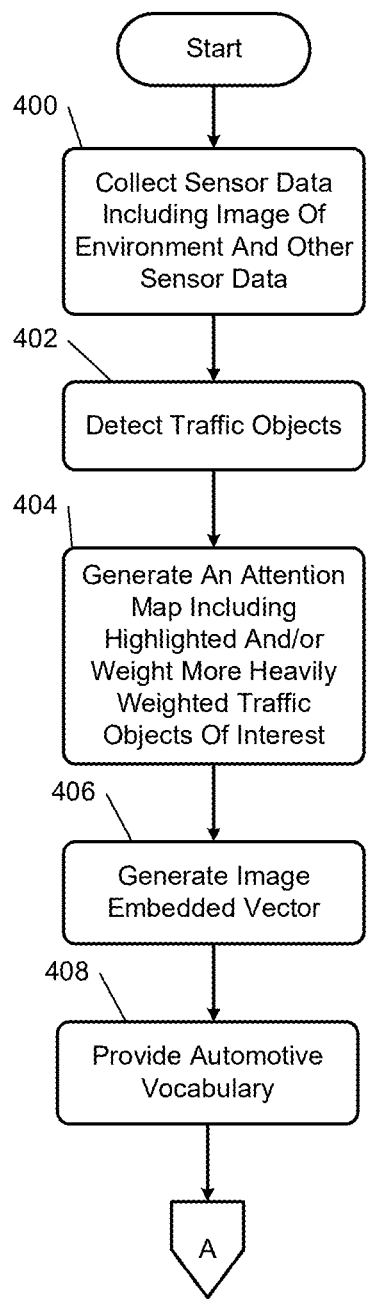
FIGS. 4A and 4B (collectively FIG. 4) illustrate a perception method including an image caption process in accordance with the present disclosure.
Figure 4B:
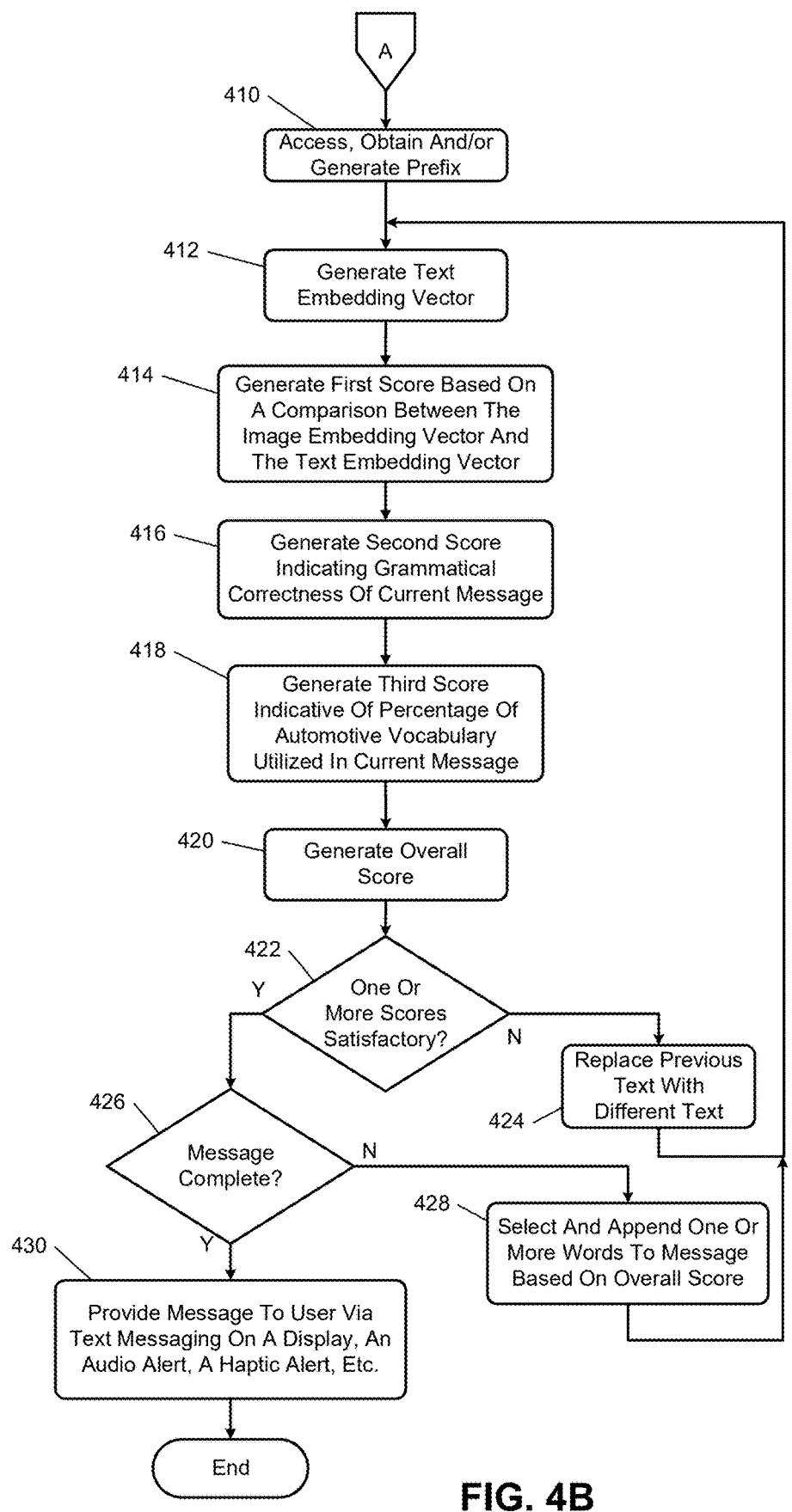

FIG. 4 shows a perception method including an image caption process. The operations of FIG. 4 may be iteratively performed. The method is primarily described with respect to the embodiments of FIGS. 1-3.

At 400, sensor data is collected from at least one image sensor (e.g., one of the imaging devices 122) at a host vehicle. This may include collecting outputs from the sensors 120 and imaging devices 122. The sensor data is received at the traffic and object detection module 200.

At 402, the traffic and object detection module 200 detects traffic objects in an environment of the host vehicle, such as traffic objects in front of the host vehicle.

At 404, the attention map highlighting module 202 generates one or more attention maps including highlighted and/or heavily weighted traffic objects based on outputs from the sensors 120 and imaging devices 122. Traffic objects are weighted more heavily than other objects. Any traffic objects of concern or within and/or crossing an upcoming path of the host vehicle may be weighted more heavily than other traffic objects.

At 406, the image encoder 204 encodes one or more images received from one or more imaging sensors such as the imaging devices 122. The image encoder 204 generates one or more image embedding vectors for the one or more images, respectively.

At 408, the automotive vocabulary module 208 access and provides automotive vocabulary to the automotive scene caption module. Operation of the automotive scene caption module 206 is described with respect to operations 410, 412, 414, 416, 418, 420, 422, 424, 426, 428 and 430. Although the following operations are described with respect to a single image, the operations may be performed for each of multiple images. The multiple images may be of different environmental regions. In an embodiment, a text message or portion thereof generated for an initial image is updated based on subsequently captured images associated with the same environmental region of the initial image.

At 410, the prefix module 300 accesses, obtains and/or generates a message prefix for an image captured at 400, as described above. At 412, the text encoder 304 encodes the prefix or the message generated thus far and generates a corresponding text embedding vector.

At 414, the vector comparing module 306 compares the text embedding vector to the image embedding vector and generates the first score as described above. At 416, the language scoring module 308 evaluates the prefix or the message generated thus far and generates a second score as described above. At 418, the automotive vocabulary scoring module 310 evaluates the prefix or the message generated thus far and generates a third score as described above.

At 420, the overall scoring module generates an overall score based on the first, second and third scores as described above. At 422, the PLM module 302 determines whether one or more scores are satisfactory. In an embodiment, the PLM module 302 determines whether the overall score is satisfactory. In another embodiment, the PLM module 302 determines whether one or more of the first, second and third scores are satisfactory. The overall score and/or one or more of the first, second and third scores may be compared to predetermined thresholds and if greater than the predetermined thresholds the scores are deemed satisfactory. If one or more of the scores are deemed satisfactory, operation 426 may be performed, otherwise operation 424 may be performed.

At 424, the PLM module 302 may replace the previous generated and/or appended text with different text. Operation 412 may be performed subsequent to operation 424. At 426, the PLM module 302 may determine whether the message is complete. If not, operation 428 may be performed, otherwise operation 430 may be performed. At 428, the PLM module 302 selects one or more words to append to the prefix and/or the current message generated thus far, as described above. To reduce processing time, operations 414, 416, 418, 420, and 422 may be concurrently performed for multiple word options or optional sets of words. The word or set of words providing the best score(s) is selected for that iteration of the process.

At 430, the automotive scene caption module 206 and/or the PLM module 302 may display the text message and/or audibly playout the text message to an occupant of the host vehicle. Haptic alerts may also or alternatively be generated based on the text message generated.

The above-described operations are meant to be illustrative examples. The operations may be performed sequentially, synchronously, simultaneously, continuously, during overlapping time periods or in a different order depending upon the application. Also, any of the operations may not be performed or skipped depending on the implementation, sequence of events, and/or some other logic (e.g., based on user experience practices or decisions).

The examples disclosed herein provide text descriptions that serve several functions including i) conveying the automotive vehicle's perception to the driver and/or passenger of the vehicle, ii) enhancing the vision-language model for automotive perception tasks, iii) providing input to the automotive vehicle planner to aid in decision-making, and iv) capturing situations during a vehicle's real time operation to continuously improve the automotive vehicle system. Vision language models that are specific for automotive applications are used by the disclosed systems. Text descriptions are logged and may be sent from a host vehicle to a back office for analyzing, refining and returning the refined text descriptions back to the host vehicle. This aids in learning difficult situations, such as situations with high probability of a collision. As an example, an image that shows a pedestrian close to a vehicle may be sent to the back office for analysis. The vision language models may be pre-trained and direct attention towards traffic objects present in scenes. Textual descriptions are generated using image embedding vectors with specific emphasis towards automotive vocabulary.

The examples disclosed herein include a method of textually depicting an automotive environment as observed via an autonomous driving perception system. The examples are applicable to explaining perception of an environment as perceived by a perception system of a vehicle to a human driver and/or passenger of the vehicle. The generated messages can increase driver and/or passenger confidence in situation awareness of the vehicle. The systems and modules disclosed herein may be used to explain perception as seen by sensors of the vehicle of areas non-visible to a vehicle occupant, such as a blind zone, an area located laterally adjacent the vehicle, an area seen by a rear camera of the vehicle, etc. The systems and modules disclosed herein can be used to explain perception of a surrounding environment of the vehicle as seen by the sensors of the vehicle. Areas of the surrounding environment can be difficult to view concurrently by a vehicle occupant.

The disclosed examples integrate generated text captions in inputs of an automotive vehicle decision making system. The examples include comparing and/or combining decision making scene comprehension with perception text captions generated based on captured images. The examples are also applicable to monitoring driver behavior, such as when fleet managers monitor fleet drivers or when teenage drivers are monitored. Critical situations are captured and reported including providing text interpretations (or captions) of the situations. The examples are further applicable for insurance purposes. On-line logging of scene descriptions is implemented, which may be used for vehicle insurance purposes in case of an accident. Text captions may be used to refine automotive vision language model encoders that are used for on-line perception tasks such as pedestrian road crossing intention estimation.

Data may be captured of an automotive vehicle in high-risk situations (e.g., a collision risk situation), which can be identified from the text caption. The data may be annotated and used for system refinement and continuous learning and for diagnostics. Vision language models are used for perception due to their high-level semantics and open vocabulary classification capabilities. However, the vision language models may be primarily trained with general images and not necessarily specific for automotive environments. The examples disclosed herein may be used to improve vision language models for automotive environments by generating many automotive images with corresponding captions.

In an embodiment, an image of a scene and the corresponding generated text message is displayed for a vehicle occupant. As a few examples, the image caption module disclosed herein may generate text messages such as "Image showing truck driver in the middle of a traffic collision", "Picture shows pedestrian walking down a sidewalk in downtown", "Picture shows pedestrian crossing in the street as she walks on foot", "Image showing pedestrians in front of a busy traffic intersection", "Vehicle crossing detected ahead", and "Pedestrian close to vehicle will trigger logging of perception data for off-line analysis".

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
a traffic object detection module configured to detect traffic objects in an environment of a vehicle;
an attention map highlighting module configured to i) generate an attention map, ii) highlight in the attention map at least one of relevant ones of the traffic objects and regions in which the relevant ones of the traffic objects are located, and iii) not highlight in the attention map non-relevant ones of the traffic objects and other non-traffic objects;
an image encoder configured, based on the attention map, to encode an image of the environment received from an imaging device and generate an image embedding vector;
a pretrained language model (PLM) module configured to perform an iterative process including iteratively selecting and appending text to create a text message, the PLM module is configured, during each iteration of the iterative process, to select text based on at least one score, the text message being a specific description of what is perceived in the environment of the vehicle;
a text encoder configured to encode a portion of the text message created thus far to generate a text embedding vector;
one or more modules configured, based on the image embedding vector and the text embedding vector, to score the portion of the text message created thus far to generate the at least one score,
wherein the PLM module is configured to update the portion of the text message created thus far based on the at least one score;
at least one output device configured to output the text message when complete for an occupant of the vehicle; and
a perception and decision-making module configured to, based on at least information in the text message describing the environment of the vehicle, perform at least one of an autonomous driving operation and a countermeasure to avoid a collision.

2. The system of claim 1, wherein for each iteration of the iterative process:
the one or more modules comprise a vector comparing module configured to compare the text embedding vector to the image embedding vector and generate a first score; and
the PLM module is configured to update the portion of the text message created thus far based on the first score.

3. The system of claim 2, wherein for each iteration of the iterative process:
the one or more modules comprise a language scoring module configured to analyze the text embedding vector to determine if the portion of the text message created thus far is grammatically correct and generate a second score based on this determination; and
the PLM module is configured to update the portion of the text message created thus far based on the second score.

4. The system of claim 3, wherein for each iteration of the iterative process:
the one or more modules comprise an automotive vocabulary scoring module configured to analyze the text embedding vector to determine how many words of the portion of the text message created thus far are not automotive words and generate a third score based on this determination; and
the PLM module is configured to update the portion of the text message created thus far based on the third score.

5. The system of claim 1, wherein:
the one or more modules comprise a plurality of scoring modules and an overall scoring module;
the plurality of scoring modules are configured, for each iteration of the iterative process, to generate a plurality of scores based on the portion of the text message created thus far;
the overall scoring module is configured to generate an overall score based on the plurality of scores; and
the PLM module is configured to update the portion of the text message created thus far based on the overall score.

6. The system of claim 5, wherein the plurality of scores include i) a first score indicative of how closely the text embedding vector matches the image embedding vector, ii) a second score indicative of how grammatically correct is the portion of the text message created thus far, and iii) a third score indicative of how many non-automotive words are included in the portion of the text message created thus far.

7. The system of claim 1, further comprising an automotive scene caption module configured to receive the image embedding vector and automotive vocabulary, and, based on the image embedding vector and the automotive vocabulary, generate the text message such that the text message is automotive specific.

8. The system of claim 1, wherein the PLM module is configured to replace one or more words of the portion of the text message created thus far based on the at least one score.

9. The system of claim 1, wherein the PLM module is configured to begin with a sentence prefix and iteratively append automotive words to the sentence prefix to generate the text message.

10. The system of claim 1, wherein the at least one output device includes a display, a speaker, and a haptic device.

11. A method of providing an image caption for an image of an environment of a vehicle, the method comprising:
detecting traffic objects in the environment of the vehicle;
generating an attention map;
highlighting in the attention map at least one of relevant ones of the traffic objects and regions in which the relevant ones of the traffic objects are located;
not highlighting in the attention map non-relevant ones of the traffic objects and other non-traffic objects;
based on the attention map, encoding the image and generating an image embedding vector;
performing an iterative process including iteratively selecting and appending text to create a text message;
during each iteration of the iterative process, selecting text based on at least one score, the text message being a specific description of what is perceived in the environment of the vehicle;
encoding a portion of the text message created thus far to generate a text embedding vector;

based on the image embedding vector and the text embedding vector, scoring the portion of the text message created thus far to generate the at least one score;

updating the portion of the text message created thus far based on the at least one score;

outputting the text message when complete for an occupant of the vehicle; and based on at least information in the text message describing the environment of the vehicle, performing at least one of an autonomous driving operation and a countermeasure to avoid a collision.

12. The method of claim 11, further comprising for each iteration of the iterative process:

comparing the text embedding vector to the image embedding vector and generate a first score; and updating the portion of the text message created thus far based on the first score.

13. The method of claim 12, further comprising for each iteration of the iterative process:

analyzing the text embedding vector to determine if the portion of the text message created thus far is grammatically correct and generate a second score based on this determination; and updating the portion of the text message created thus far based on the second score.

14. The method of claim 11, further comprising for each iteration of the iterative process:

analyzing the text embedding vector to determine how many words of the portion of the text message created thus far are not automotive words and generate a third score based on this determination; and updating the portion of the text message created thus far based on the third score.

15. The method of claim 11, further comprising:

for each iteration of the iterative process, generating a plurality of scores based on the portion of the text message created thus far;

generating an overall score based on the plurality of scores; and updating the portion of the text message created thus far based on the overall score.

16. The method of claim 15, wherein the plurality of scores include i) a first score indicative of how closely the text embedding vector matches the image embedding vector, ii) a second score indicative of how grammatically correct is the portion of the text message created thus far, and iii) a third score indicative of how many non-automotive words are included in the portion of the text message created thus far.

17. The method of claim 11, further comprising:

receiving the image embedding vector and automotive vocabulary; and based on the image encoding vector and the automotive vocabulary, generating the text message such that the text message is automotive specific.

18. The method of claim 11, further comprising replacing one or more words of the portion of the text message created thus far based on the at least one score.

* * * * *